Jan. 23, 1962 K. E. FARR 3,018,328

TUNING SYSTEM FOR TELEVISION RECEIVERS

Filed July 1, 1958 2 Sheets-Sheet 1

WITNESSES:

Bernard R. Gieguey

James F. Young

INVENTOR

Kenneth E. Farr

BY Benjamin DeWitt

ATTORNEY

Jan. 23, 1962 K. E. FARR 3,018,328

TUNING SYSTEM FOR TELEVISION RECEIVERS

Filed July 1, 1958 2 Sheets-Sheet 2

United States Patent Office 3,018,328
Patented Jan. 23, 1962

3,018,328
TUNING SYSTEM FOR TELEVISION RECEIVERS

Kenneth E. Farr, Rockefeller Township, Northumberland County, Pa., assignor to Westinghouse Electric Corporation, East Pittsburgh, Pa., a corporation of Pennsylvania Filed July 1, 1958, Ser. No. 745,986
4 Claims. (Cl. 178—5.8)

This invention relates generally to television receivers and, more particularly, to improvement in the weak-signal performance of automatic frequency control circuits for such receivers.

The principles of intercarrier sound television reception are well known in the art; one description of an intercarrier system may be found in U.S. Patent No. 2,448,908. For this reason, there will be no discussion of those principles in the following specifications. The terms "intercarrier frequency" and "intercarrier signal" used in the specification and claims are intended to designate the beat frequency between picture and sound carriers. According to present standards this frequency difference is 4.5 megacycles. Should these standards be changed by specifying a different carrier frequency spacing the term "intercarrier frequency" will designate the new frequency spacing between the picture and sound carriers, and "intercarrier signal" will designate the new difference signal which may be derived by heterodyning the picture and sound carriers.

It has been the practice in television receivers of the intercarrier type to employ some sort of attenuation circuit to control the sound carrier amplitude relative to the picture carrier level. Such attenuation circuits are provided primarily to prevent beats in the second detector between the sound carrier and high frequency video components. In a single second detector type of color television receiver, an even greater attenuation is usually required at the accompanying sound carrier frequency to prevent beats between the high frequency color components and the sound carrier.

To achieve maximum benefit from such attenuation circuits, it is desirable that the frequency of the local oscillator in both monochrome and color television receivers be controlled to control the frequency of the intermediate sound signal to thereby effect adequate rejection of the sound carrier.

In the copending application Serial No. 722,735, filed March 20, 1958, entitled "Television Apparatus" by Charles W. Baugh, Jr., and assigned to the present assignee, there is described an automatic fine tuning (AFT) system for an intercarrier type television receiver by means of which the frequency of the local oscillator is controlled. In said copending application, a first control signal which is a function of the intercarrier sound signal amplitude is utilized to control the frequency of the local oscillator, and a second control signal which is a function of the direct current component or average direct current voltage developed at the second detector is utilized in supplement to the first control signal to provide improved AFT pull-in.

With television receivers not having automatic fine tuning (AFT) many television viewers tend to watch programs under the strain of improperly tuned pictures. Automatic fine tuning circuits of the aforementioned type electronically maintain the tuner oscillator on correct frequency thereby avoiding the loss of picture detail and eliminating the sound-in-pictures interference which commonly accompanies oscillator frequency drift. In addition, AFT greatly simplifies the provision of remote control systems for television receivers thereby reducing the cost of such receivers.

One factor which has heretofore limited the commercial use of AFT systems was the necessity of providing for abnormal tuning when operating under unfavorable conditions such as reception of weak fringe-area signals. In any television receiver, as the received signal strength at the antenna decreases, it is desirable to adjust the receiver tuning lower in frequency so as to bring the IF picture carrier nearer to the top of the IF response characteristic for improved signal-to-noise ratio. Also, in television receivers using AGC, there is usually not sufficient gain to provide a flat input-output characteristic down to the noise level. In other words, at signal strengths which are still sufficiently above the noise level to be usable, and with the AGC controlled stages operating at maximum gain, the output signal from the second detector is much lower in amplitude than that which exists when receiving a strong signal.

In television receivers utilizing AFT circuits, the reduced output signal from the second detector adversely affects the AFT pull-in range because both the direct current voltage component at the second detector output and the 4.5 mc. intercarrier signal are reduced in amplitude. Thus, it is desirable, in the presence of weaker-than-normal signals, to shift the open-loop tuning of the receiver to a lower frequency so as to improve the pull-in characteristic of the AFT circuits.

Accordingly, among the objects of the present invention are the following:

To provide an improved automatic fine tuning system for intercarrier television receivers which is operative to maintain the intermediate frequency carrier signals at or near predetermined frequencies.

To provide an improved automatic fine tuning system including means to compensate for the aforedescribed decrease in outut signal from the second detector which accompanies decrease in the received signal at the antenna.

To provide an improved means for controlling the frequency of the local oscillator in a manner such that the IF video carrier signal is maintained at a predetermined amplitude response point of the receiver frequency response characteristic when the amplitude of said carrier signal is above a predetermined level and such that said carrier signal is shifted toward a higher response point when its amplitude falls below that predetermined level.

To provide an intercarrier television receiver having an improved automatic fine tuning means requiring a minimum of inexpensive components and structures.

Briefly, the foregoing objectives may be achieved by developing a first control signal which varies as a function of the intercarrier signal amplitude and a second control signal which varies as a function of the gain of the radio frequency and/or the intermediate frequency amplifiers. The first and second control signals may be combined and employed in such a manner as to control the local oscillator frequency. The local oscillator then controls the positions of the IF carriers, relative to the frequency response characteristic of the intermediate frequency amplifier, so that in the presence of normal strength received signals, the video carrier is maintained near the optimum position for correct vestigial side-band reception, adequate video bandwidth and proper IF sound carrier rejection. In the presence of weaker-than-normal signals, the IF video carrier is dynamically positioned at points of higher amplitude response on the intermediate frequency amplifier response characteristic to provide enhanced gain.

The foregoing and other objects of this invention will be apparent from the following description taken in accordance with the accompanying drawings throughout which like characters indicate like parts and in which.

Figure 1:
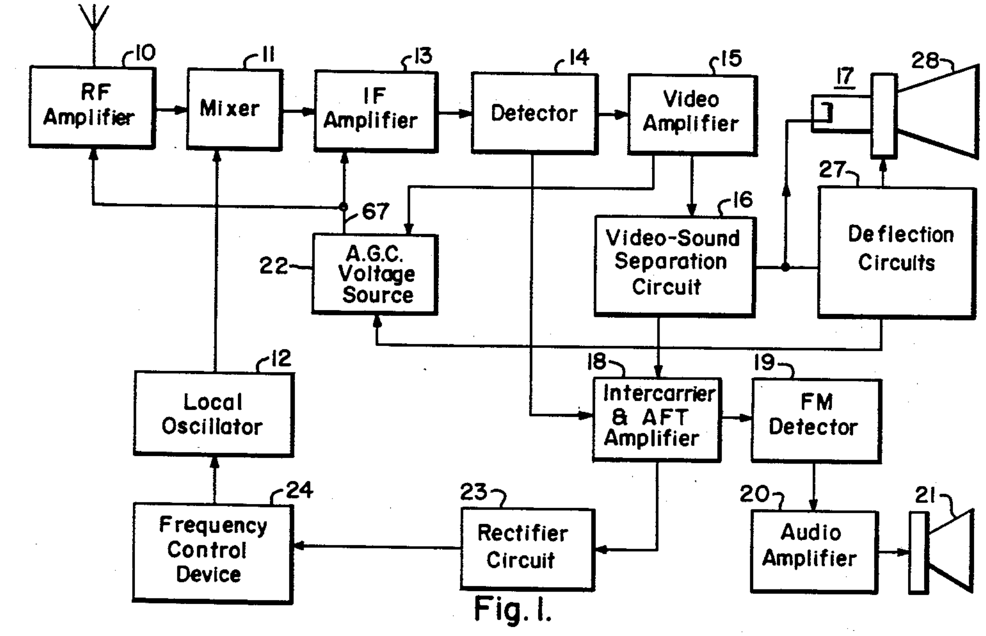
FIGURE 1 is a block diagram of the television receiver in accordance with the invention.

Referring to FIG. 1, there is shown an RF amplifier 10, an oscillator 12, a mixer 11, an intermediate frequency amplifier 13, a second detector 14, a video amplifier 15, a video sound separation circuit 16, and an automatic gain control circuit 22, which components will be recognizable to those skilled in the television art as being exemplary components of one form of intercarrier television receiver. The television signal is intercepted by an antenna connected to the input of the RF amplifier 10 and is translated through circuits 10 to 16 to produce a video signal at the output of separation circuit 16 which signal is suitable for application to a conventional image reproducing device 17. In addition, the second detector 14 operates to heterodyne the intermediate frequency sound and picture carriers to produce an intercarrier beat frequency signal of a nominal frequency corresponding to the frequency difference between the IF picture and sound carriers.

Figure 3A:
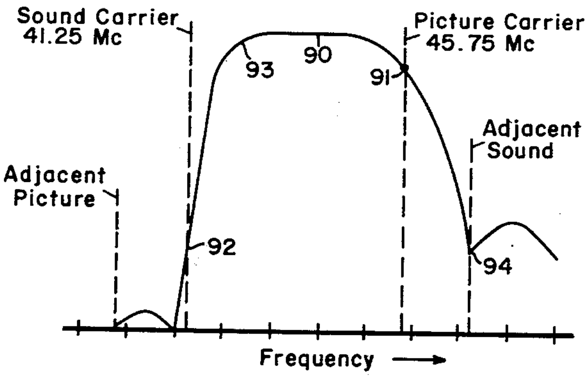
FIGS. 3*a*, 3*b*, 3*c* and 3*d* show a plurality of curves illustrating the manner in which certain signals and potentials in the automatic frequency control system vary as functions of the frequency of the IF carrier signals.

The intermediate frequency amplifier 13 preferably has a frequency response characteristic substantially as indicated by curve 90 in FIG. 3A. On curve 90 point 91 represents the preferred location of the IF picture carrier approximately 6 decibels below the maximum IF response, and point 92 defines the preferred location of the IF sound carrier. When so located, the sound carrier is attenuated about 30 to 50 decibels below the maximum IF response level.

At least about 30 decibels difference in amplification of the IF sound carrier relative to amplification of the IF picture carrier is desirable to (1) prevent sound signal components from appearing in the demodulated output of detector 14 and (2) to enable production of a 4.5 megacycle intercarrier signal having a constant amplitude independent of amplitude modulation of the picture carrier. The foregoing is in accord with the principle that the amplitude of a beat frequency from a linear detector is determined by the amplitude of the smaller heterodyning signal and is independent of the amplitude of the larger signal (provided that the two signals are substantially different in amplitude).

Figure 3B:
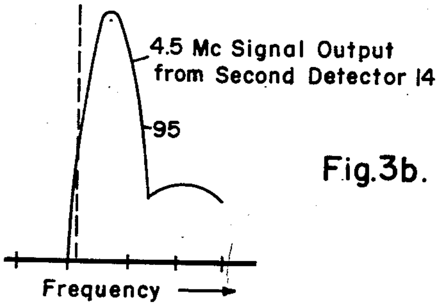

Curve 95 in FIG. 3B indicates the manner in which the amplitude of the intercarrier signal at the output of the second detector 14 varies as the IF picture and sound carrier signals are varied in frequency. The amplitude of the intercarrier signal at the output of second detector 14 is a function of the position of the intermediate frequency sound carrier signal with respect to the frequency response characteristic 90. The amplitude of the intercarrier signal will change whenever the intermediate frequency video and sound carrier signals depart from the predetermined normal positions 91 and 92 as indicated in FIG. 3A.

Thus, the intercarrier type system including circuits 10 to 15 constitutes means for deriving and providing to separating circuit 16, a frequency modulated intercarrier signal the amplitude of which is dependent upon the deviation of the intermediate frequency sound carrier from a predetermined frequency. The correctness of tuning of local oscillator 12 determines the frequency of the IF sound carrier. Accordingly, the intercarrier signal amplitude is dependent upon the tuning of oscillator 12. The amplitude of the intercarrier signal is further dependent upon the AGC circuit 22 which holds the peaks of the demodulated video wave at a constant level by control of the gain of RF amplifier 10 and the gain of IF amplifier 13. The video sound separation circuit 16 separates the demodulated video signal from the intercarrier sound signal and applies the video signal to a conventional image reproducing system 17 which may include a conventional cathode ray tube 28 and the usual deflection circuits 27.

The composite signal at the output of video amplifier 15, including the demodulated video and the intercarrier signal is applied to the automatic gain control circuit 22, to which is also applied a series of energizing pulses from deflection circuit 27. The AGC circuit 22 is of the "peak detection type" which acts in a well known manner to produce a direct current output voltage corresponding in magnitude to the magnitude of the peak values of the video signal from amplifier 15. The output voltage from AGC circuit 22 is applied via an AGC bus 67 to RF amplifier 10 and IF amplifier 13 to control the amplification factors of those amplifiers in a well known manner. Specifically, the AGC circuit 22 regulates the gain of amplifiers 10 and 13 to maintain the intermediate frequency carrier signals substantially constant in amplitude at the input to detector 14 so long as the strength of the received television signals at the antenna is within the normal signal strength range. In the presence of weaker-than-normal received signals at the antenna, AGC circuit 22 permits amplifiers 10 and 13 to operate at maximum gain and accordingly, does not function to control the amplitudes of the intermediate frequency carrier signals.

Figure 2:
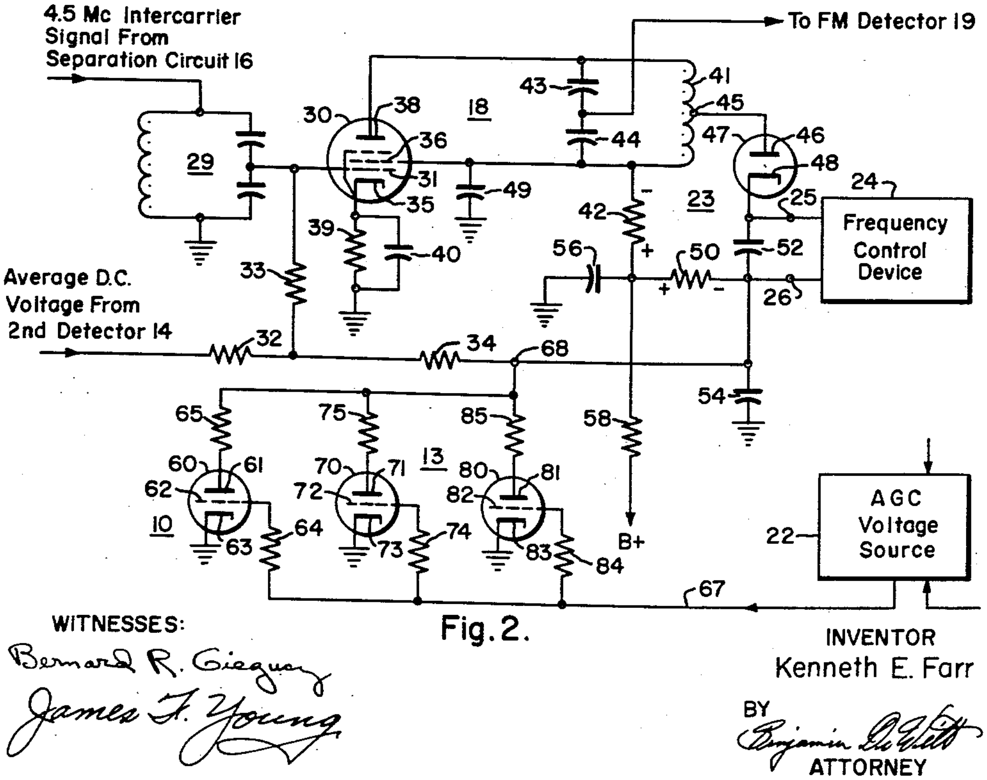
FIG. 2 is a circuit diagram in schematic form of an automatic frequency control circuit in accordance with the invention.

The intercarrier signal from separation circuit 16 is applied to a sound signal channel including an intercarrier amplifier 18, a frequency modulation detector 19, a conventional audio amplifier 20, and a sound reproducing device 21. A rectifier circuit 23 is connected between the amplifier 18 and a frequency control device 24. Amplifier 18 together with the rectifier circuit 23 constitutes a circuit means for providing a first direct current control signal having a magnitude which varies as a function of frequency variations of the intermediate frequency sound carrier signal. Specifically, the direct current control signal produced by rectifier circuit 23 has a magnitude related to the amplitude of the intercarrier signal. The intercarrier signal varies in amplitude as a function of the departure of the intermediate frequency sound carrier from the point 92 as shown in FIG. 3A. The output control signal from the rectifier signal 23 is applied to the frequency control device 24 which operates in response to the first direct current control signal to control the frequency of the local oscillator 12. The frequency control device 24 may comprise a semiconductor diode which, in series with a capacitor, is connected across the tank circuit of the local oscillator 12 thereby shunting a variable reactance across the tank circuit and hence comprising means for changing the frequency of the local oscillator. Variation of reactance is accomplished by varying the reactive load applied to the semiconductor diode to control its conduction. Variable loading of the diode is supplied by the direct current control potential applied to the input terminals 25 and 26 of control device 24 as shown in FIG. 2.

The second detector 14 may comprise any one of various known detector circuits, or, in a preferred embodiment, it may take the form of the particular detector circuit described in detail in copending application Serial No. 660,870, filed May 22, 1957, entitled "Television Apparatus" by Charles W. Baugh, Jr., and assigned to the present assignee. As described in that copending application, the detector 14 in addition to providing an intercarrier signal and an alternating current video signal, also produces a direct current voltage which normally represents the average brightness of the televised scene. This direct current voltage or direct current component of the second detector output has a substantially constant first value when the IF picture carrier is located within the IF passband. However, when the local oscillator 12 is turned abnormally high in frequency, the IF picture carirer is attenuated, and the IF sound carrier becomes the stronger signal at detector 14. Under this condition, the average direct current voltage at the output of detector 14 assumes a second value. This direct current voltage from the output of detector 14 is applied to intercarrier amplifier 18 and is there combined with the first direct current control signal so that the rectifier circuit 23 applies the first direct current control signal and a second direct current control signal in combination to the frequency control device 24.

Figure 3C:
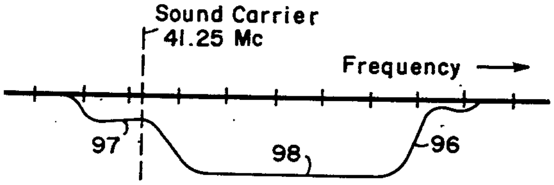
Figure 3D:
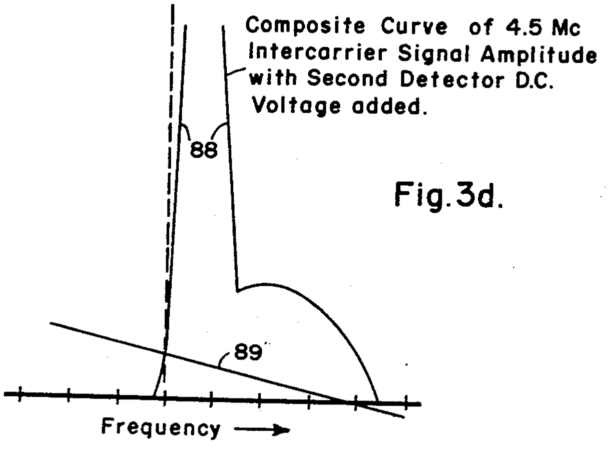

Under conditions where the IF picture carrier signal is the stronger signal at the second detector, both the first and second direct current control signals are utilized to control the frequency control device 24. Under conditions where the intermediate frequency sound carrier is the stronger signal at the second detector, and no intercarrier sound signal is developed, the first direct current control signal vanishes and the second direct current signal controls the frequency control device 24. The second direct current control signal at this time, is markedly different in value due to the change in level of the direct current component developed at the second detector by reason of the fact that the signal detected at his time is a frequency modulated signal rather than one modulated with video information. In FIG. 3B, curve 95 indicates the first direct current control signal produced by rectification of the intercarrier sound signal by the rectifier circuit 23. The amplitude of this first control signal varies as a function of the amplitude of the intercarrier sound signal and hence is a function of the frequency of the IF sound carrier. In FIG. 3C, curve 96 indicates the second direct current control signal corresponding to the average direct current component at the output of second detector 14. With the intermediate frequency video and sound signals located respectively at points 91 and 92, of FIG. 3A, the magnitude of the second direct current control signal will correspond to the level at point 97 in FIG. 3C and the automatic gain control circuit 22 will operate to hold the peak value of the video signal output from second detector 14 substantially constant. When the local oscillator 12 is tuned high in frequency, the intermediate frequency sound and picture carrier signals will be located at points 93 and 94, respectively, on curve 90, and the level of the second direct current control signal will correspond to the level indicated at point 98 in FIG. 3C. In FIG. 3D, curve 88 indicates the composite direct current control potential as applied to the frequency control element 24 and curve 89 represents the frequency control characteristic of the frequency control device 24. Curve 88 indicates the combination of the first direct current control signal as shown in FIG. 3B with the second direct current control signal as shown in FIG. 3C.

The system as thus far described is substantially identical to that set forth in detail in the aforementioned copending application Serial No. 722,735, and hence need not be further particularized here. FIG. 2 shows schematically a portion of the AFT system of the present invention. In accordance with the present invention, a third direct current control signal having a magnitude which varies as a function of the intermediate frequency amplifier gain is used to supplement the first and second AFT control signals. This third control signal operates to shift the oscillator frequency when the received signal strength at the antenna falls below a predetermined value, thereby improving the weak signal performance of the AFT system.

Referring to FIG. 2 in detail, the intercarrier signal from the video sound separation circuit 16 is coupled to the control grid 31 of an electron discharge device 30 by way of a conventional bandpass filter 29. The second direct current control signal from second detector 14 is applied through serially connected resistors 32 and 33 to the control grid 31 of the device 30. From the junction point of resistors 32 and 33, a connection is made through a resistor 34 to a common terminal 68 and thence to a terminal 26 of the frequency control device 24. Electron discharge device 30 also has a cathode 35, a screen grid 36 and an anode 38. The cathode 35 is connected to ground potential through a cathode bias resistor 39 shunted by a capacitor 40. The anode 38 is connected through an inductor 41, a first voltage dropping resistor 42 and a second voltage dropping resistor 58 to the positive terminal B+ of a conventional source of unidirectional potential. The negative terminal of the unidirectional voltage source is connected to a point of reference potential or ground in accordance with conventional practice. A pair of capacitors 43 and 44 are connected in series across the inductor 41 and from the junction point between them, a connection is made to the frequency modulation detector 19. An intermediate tap 45 on the inductor 41 is connected to the anode 16 of a diode rectifier device 47. A first terminal 25 of the frequency control device 24 is connected to the cathode or emitter electrode 48 of the rectifier device 47. A second terminal 26 of the frequency control device 24 is connected through a resistor 50 to the junction point between dropping resistors 42 and 58. A filter capacitor 52 is shunted across the terminals 25 and 26 to filter intercarrier frequency components out of the first direct current control signal which is applied to the frequency control device 24 from the rectifier device 47.

The electron discharge device 30 together with its immediately associated circuits including inductor 41 and capacitors 43 and 44 constitutes an intercarrier signal amplifier corresponding to the amplifier 18 of FIG. 1. The intercarrier amplifier is operative to amplify intercarrier signals applied thereto from separation circuit 16 and to transmit the amplified intercarrier signals to the FM detector 19. In addition, the intercarrier amplifier 30 applies the amplified intercarrier signal to the rectifier device 47 by way of the intermediate terminal 45.

Rectifier device 47, the lower portion of inductor 41, capacitor 49 and capacitor 54 with their respective interconnections comprise a rectifier circuit corresponding to circuit 23 of FIG. 1 for producing the first direct current control signal in response to the intercarrier signal at the output of amplifier 18. Capacitor 49 is connected from the screen grid 36 of discharge device 30 to ground and is further connected to the lower end of inductor 41 and to the positive terminal B+ through series resistors 42 and 58. A bypass capacitor 54 is connected from the second terminal 26 of the frequency control device 24 to ground. The frequency control device is connected to oscillator 12 as shown in FIG. 1 and operates to control the frequencies of IF picture and sound carrier signals in response to the magnitude of the first direct current control signal from rectifier 47 and also in response the second direct current control signal which appears across resistor 42. The second control signal is applied to terminal 26 by way of resistor 50 and to terminal 25 by way of inductor 41 and diode 47.

As shown in FIG. 2, the RF amplifier 10 includes an electron discharge device 60 having at least an anode 61, a control electrode 62 and a cathode 63. The cathode 63 is connected directly to ground, the anode 61 is connected through a load resistor 65 to the common terminal 68, and the control electrode 62 is connected through an isolating resistor 64 to an automatic gain control bus 67. The intermediate frequency amplifier 13 may include two or more amplification stages which are shown by way of example in FIG. 2 as electron discharge devices 70 and 80. The IF amplifier discharge device 70 has at least an anode 71, a control electrode 72 and a cathode 73. Similarly, the second IF amplifier discharge device 80 has an anode 81, a control electrode 82 and a cathode 83. The cathodes 73 and 83 are connected directly to ground. The anodes 71 and 81 are respectively connected through similar load resistors 75 and 85 to the common terminal 68. The control electrodes 72 and 82 are respectively connected through similar isolating resistors 74 and 84 to the automatic gain control bus 67. It is to be understood that the RF amplifier 60 and the IF amplifier stages 70 and 80 are well known, per se, and may have any of various common forms. For instance, the discharge devices 60, 70 and 80 may be pentodes rather than triodes and obviously, are provided with high frequency input and output circuits in accordance with conventional practice. The high frequency circuits of the discharge devices 60, 70 and 80 have been omitted from FIG. 2 for clarity. Only the elements pertinent to the operation of the present invention are shown in detail in FIG. 2.

Anode voltage for operating the discharge devices 60, 70 and 80 is supplied from the unidirectional voltage source B+ through resistor 58, resistor 50, common terminal 68 and the respective load resistors 65, 75 and 85. Thus, the total anode current of the automatic gain controlled stages flows through the resistor 50 and accordingly, a voltage drop will appear across the resistor 50 which increases as the anode currents of the gain controlled amplifiers increase. Thus, resistor 50 together with its interconnections to common terminal 68 and to resistor 42 and the frequency control device 24 constitutes a circuit means for deriving a third direct current control signal, the magnitude of which varies as a function of the gain or the amplification factor of the gain controlled amplifiers 10 and 13.

Operation of the automatic fine tuning system as shown in FIG. 2 will now be considered. As shown and described in detail in the aforementioned copending application, Serial No. 722,735, the frequency controlling device 24 includes a semiconductor diode and a capacitor serially connected across the tank circuit of the oscillator 12. That diode rectifies a portion of the oscillator output signal and charges capacitor 52 to a potential corresponding to the peak amplitude of the oscillator output. Thus, the frequency control device 24 constitutes a capacitive load on the oscillator and the oscillator will operate at a frequency less than its natural frequency, with the frequency differential being proportional to the average current flowing from control device 24 to terminals 25 and 26. Accordingly, the oscillator frequency may be varied by varying the effective resistance connected across terminals 25 and 26. The diode rectifier 47 together with amplifier device 30 constitutes a first circuit means for applying a first direct current signal to terminals 25 and 26. Resistor 42 together with the circuitry for generating a potential thereacross constitutes a circuit means for applying a second direct current control signal to the terminals 25 and 26 and resistor 50 constitutes means for applying a third direct current control signal serially with the second direct current control signal to the terminals 25 and 26.

When an active television channel is selected, the received television signals are respectively converted in the mixer 11 to intermediate frequency signals. The local oscillator 12 is initially tuned high, hence the intermediate frequency sound carrier will be located at a position, such as at 93, which is high up on the response characteristic of the IF amplifier 13 and the IF picture carrier will be at a position such as at 94. The intermediate frequency picture carrier, at this position, is so greatly attenuated that no beat between the IF picture and sound carriers occurs and no video signals or intercarrier sound signal will be developed. Under this condition the consequent large amplitude of the intermediate frequency sound carrier will cause a comparatively large direct current voltage to be developed at the second detector 14 as shown at 98 in FIG. 3C. This direct current voltage which is of negative polarity is applied through resistors 32 and 33 to bias the grid 31 of discharge device 30 negatively causing device 30 to approach cutoff. At this time, the device 30 is acting as a direct current amplifier. Only a small voltage drop is developed across the resistor 42 and the diode 47 is permitted to conduct through the loop comprising control device 24, terminal 26, resistor 50, resistor 42, the lower part of inductor 41, rectifier 47 and terminal 25. This current flow through the control device 24 lowers the effective load resistance at terminals 25 and 26 thereby shifting the frequency of the local oscillator 12 downwardly. The IF sound carrier is shifted lower in frequency so that it moves down the response characteristic toward point 92 and the IF picture carrier moves up the response characteristic toward point 91 of FIG. 3A.

As the amplitude of the IF picture carrier increases, a 4.5 megacycle intercarrier sound signal is developed at detector 14 by heterodyning of the two IF carrier signals. As the sound IF carrier decreases, the bias voltage applied to discharge device 30 by way of resistors 32 and 33 will decrease so that discharge device 30 becomes increasingly operative to amplify the intercarrier signal. Discharge device 30 conducts a greater average anode current to gradually increase the voltage drop across the resistor 42. Thus, the voltage drop across resistor 42 will combine with the direct current voltage developed by rectifier 47 in response to the 4.5 megacycle intercarrier signal to apply a direct current control potential across terminals 25 and 26. Referring to FIG. 3A, it is seen that as the oscillator and the IF sound carrier frequencies decrease, the amplitude of the IF sound carrier will decrease in a substantially linear manner. As the IF sound carrier signal becomes considerably smaller in amplitude than the IF picture carrier, the sound carrier will control the amplitude of the intercarrier beat signal. When the sound carrier is in the general vicinity of point 92, the intercarrier signal will vary in amplitude in proportion to the amplitude of the IF sound carrier. When the local oscillator 12 approaches correct frequency, the IF sound carrier approaches point 92 of FIG. 3A and the intercarrier signal has relatively low amplitude. Under this condition, the magnitude of the first direct current control signal as developed by rectifier 47 is a function of the intercarrier signal amplitude. This control current is representative of the difference between the controlled frequency and the desired frequency of the local oscillator. The frequency control device 24 develops capacitive reactance to maintain the frequency of the local oscillator at the correct value thereby maintaining the IF carrier signals at or near predetermined desired frequencies as indicated at points 91 and 92 in FIG. 3A.

If the local oscillator 12 should drift high in frequency the intercarrier sound signal will increase in amplitude and rectifier device 47 will induce an increased control current through frequency control device 24. The increase in control current lowers the frequency of the local oscillator. Conversely, if the local oscillator should drift low in frequency, the intercarrier signal will decrease in amplitude and a lesser voltage will be generated by rectifier 47 thereby providing a decrease in the control current through device 24. Thus, it is seen that the automatic fine tuning system operates to stabilize the frequency of the local oscillator so that the IF sound carrier is maintained at or near point 92 of FIG. 3 and the intercarrier signal is held between predetermined minimum and maximum amplitude limits.

Now consider the operation of the system of FIG. 2 with a weaker-than-normal radio frequency signal being received at the antenna of the receiver. The AGC circuit 22 permits the amplifiers 10 and 13 to operate at maximum gain. That is, the negative voltage applied to the control electrodes of discharge devices 60, 70 and 80 from AGC bus 67 drops to a minimum and the average direct current through discharge devices 60, 70 and 80 increases to a maximum. With the amplifiers 10 and 13 at maximum gain, further decrease in the input signal at the antenna is not compensated by the AGC circuit 22 and hence, the amplitudes of the intermediate frequency carrier signals decrease resulting in decreased amplitude of the intercarrier signal at the output of detector 14 and a corresponding decrease in the average direct current voltage at the output of detector 14.

The weak output signals from detector 14 cause the following undesirable effects. The direct current voltage applied to control electrode 31 of discharge device 30 via resistors 32 and 33 decreases permitting the anode current to increase. The increased average anode current flowing through resistor 42 and resistor 58 to the positive terminal B+ tends to increase the bucking voltage applied to terminals 25 and 26 from resistor 42 thereby tending to set the stabilization point of the oscillator at higher frequency.

Similarly, the decrease in amplitude of the 4.5 megacycle intercarrier signal, as applied from detector 14 to discharge device 30, results in a decreased intercarrier signal amplitude across the lower portion of inductor 41 and hence, decreased rectification by diode 47. The decreased strength of the first direct current control signal from diode 47 tends to deteriorate the pull-in characteristic of the AFT system. The foregoing undesirable effects are compensated by increased voltage drop across resistor 50 caused by the maximum anode current flowing through resistor 50 from the discharge devices 60, 70 and 80. Since the negative AGC voltage from bus 67 is at a minimum, the combined anode currents flowing through resistor 50 rise to a maximum and cause an increase in current flow from terminal 25 through diode 47, and resistors 42 and 58 to the positive terminal B+. The increased electron current flow from terminal 26 through the frequency control device 24 lowers the tuned frequency of the oscillator thereby causing the intermediate frequency sound carrier to be initially located closer to the point 92 in FIG. 3A. Thus, the third control signal appearing across resistor 50 compensates for the degeneration of the second control signal and in addition, sets the open loop receiver tuned frequency at a lower frequency point so as to facilitate AFT pull-in under weaker-than-normal received signal conditions.

While the present invention has been described in one form only, it will be obvious to those skilled in the art that it is not so limited, but is susceptible of various changes and modifications without departing from the spirit and scope thereof.

I claim as my invention:

1. In a superheterodyne receiver including a source of first and second signals having frequencies to be controlled and an intermediate frequency amplifier having an output and a non-linear frequency response characteristic such that said first signal is normally located at a predetermined point on a sloping portion of said characteristic, and such that the amplitude of said first signal at said output varies as a function of the frequency thereof in accordance with said characteristic and such that the amplitude of said second signal varies as a function of the gain of said intermediate frequency amplifier; the combination of: means coupled to said amplifier output for amplitude demodulating and heterodyning said signals to provide a composite signal including amplitude demodulation products proportional to the amplitude of said first and second signals and an intercarrier wave having an amplitude varying as a function of the amplitude of said signals, first control means coupled between said amplitude demodulating means and said source for controlling the frequencies of said first and second signals in accordance with the amplitude level of said composite signals; second control means coupled between said demodulating means and said intermediate frequency amplifier for controlling the gain thereof in response to the amplitude of said composite signal; means connected to said intermediate frequency amplifier for producing a direct current control signal of a magnitude which varies as a function of the gain thereof, and means responsive to said direct current control signal and connected with said first control means to vary the frequencies of said first and second signals in inverse relation to said gain.

2. An intercarrier sound television receiver for utilizing a picture carrier amplitude-modulated with video information and for concurrently utilizing a sound carrier having a fixed frequency separation from said picture carrier and frequency-modulated with sound information, said receiver comprising: a first detector including a tunable heterodyning oscillator for converting said carriers to intermediate-frequency picture and sound signals; an intermediate-frequency channel including an amplifier coupled to said first detector and presenting a sloping frequency-response characteristic to said sound signal; a second detector coupled to said channel for amplitude detecting and heterodyning said signals to produce an amplitude detected signal proportional to the amplitude of said carrier waves and to also produce an intercarrier signal having an amplitude varying as a function of the amplitude of said picture and sound signals; an automatic gain control circuit coupled between said second detector and said amplifier for controlling the gain thereof in accordance with maximum amplitude portions of said detected signal; first circuit means coupled to said second detector for producing a first control signal corresponding to the amplitude of said intercarrier signal and having amplitude variations representing frequency variations of said heterodyning oscillator from a reference frequency; second circuit means connected to said second detector for producing a second control signal related to the magnitude of the average direct current voltage at the output of said second detector; third circuit means connected to said amplifier for producing a third control signal which varies as a function of the gain of said amplifier; combining means connected to said first, second and third circuit means for combining said first, second and third control signals to provide a composite control signal; and means connected to said combining means and responsive to said composite control signal for controlling the frequency of said oscillator and the frequencies of said intermediate frequency picture and sound signals.

3. An intercarrier sound television receiver for utilizing a picture carrier amplitude-modulated with video information and for concurrently utilizing a sound carrier having a fixed frequency separation from said picture carrier and frequency-modulated with sound information, said receiver comprising: a first detector including a tunable heterodyning oscillator for converting said carriers to intermediate-frequency picture and sound signals; an intermediate-frequency amplifier coupled to said first detector and presenting a sloping frequency-response characteristic to said sound signal; a second detector coupled to said amplifier for amplitude detecting and heterodyning said signals to produce a composite video signal proportional to the amplitude of said carrier waves and to also produce an intercarrier signal having an amplitude dependent upon the amplitude of said sound signal as determined by the frequency of said sound signal relative to said sloping frequency-response characteristic; an automatic gain control circuit coupled between said detector and said intermediate frequency amplifier for controlling the amplification factor thereof and the amplification of said intermediate frequency signals; first circuit means for rectifying said intercarrier signal to derive a first control potential having amplitude variations corresponding to frequency variations of said intermediate frequency sound signal from a reference frequency; means coupled between said second detector and said rectifier circuit for applying said intercarrier signal thereto; second circuit means connected to said detector for producing a second control signal which varies as a function of the direct current voltage component of the composite video signal at the output of said second detector; third circuit means connected to said intermediate frequency amplifier for producing a third control signal which varies as a function of the amplification factor of said amplifier; frequency control means connected to said oscillator and having an input circuit to which a direct current control potential may be applied for tuning said oscillator; and means connecting said first, second and third circuit means for combining said first, second and third control signals to produce a direct current control potential which varies as a composite function of said control signals, said last mentioned means being connected to said input circuit.

4. In a television receiver for receiving television signals consisting of a video modulated carrier wave of a first frequency and an associated sound modulated carrier wave of a second frequency having a predetermined relation to said first frequency, and in which means comprising a local oscillator is utilized for converting said waves to intermediate frequency picture and sound carrier signals, and in which means comprising a variable gain amplifier is utilized for amplifying said carrier signals, and in which said amplified carrier signals are amplitude detected and heterodyned to provide a detected signal proportional to the amplitude of said amplified carrier signals and to also provide an intercarrier sound wave having an amplitude varying as a function of the amplitude of said amplified carrier signals, means for producing a first control signal proportional to the average amplitude of said detected signal, means for producing a second control signal varying in accordance with the amplitude of said intercarrier wave, automatic gain control means for producing a direct current bias potential corresponding to the average amplitude of said detected signal and for applying said bias potential to said variable gain amplifier to control the gain thereof, means for producing a third control signal varying as a function of the gain of said amplifier, and means for controlling the frequency of said local oscillator in response to said first, second and third control signals.

References Cited in the file of this patent

UNITED STATES PATENTS

| | | |
|---|---|---|
| 2,632,047 | Schlesinger | Mar. 17, 1953 |
| 2,664,464 | Cotsworth | Dec. 29, 1953 |
| 2,891,105 | Keizer | June 16, 1959 |
| 2,916,545 | Baugh | Dec. 8, 1959 |

FOREIGN PATENTS

| | | |
|---|---|---|
| 479,458 | Canada | Dec. 18, 1951 |